Feb. 25, 1941.                P. KOLLSMAN                2,232,789
                               TACHOMETER
             Filed March 22, 1937            5 Sheets-Sheet 2
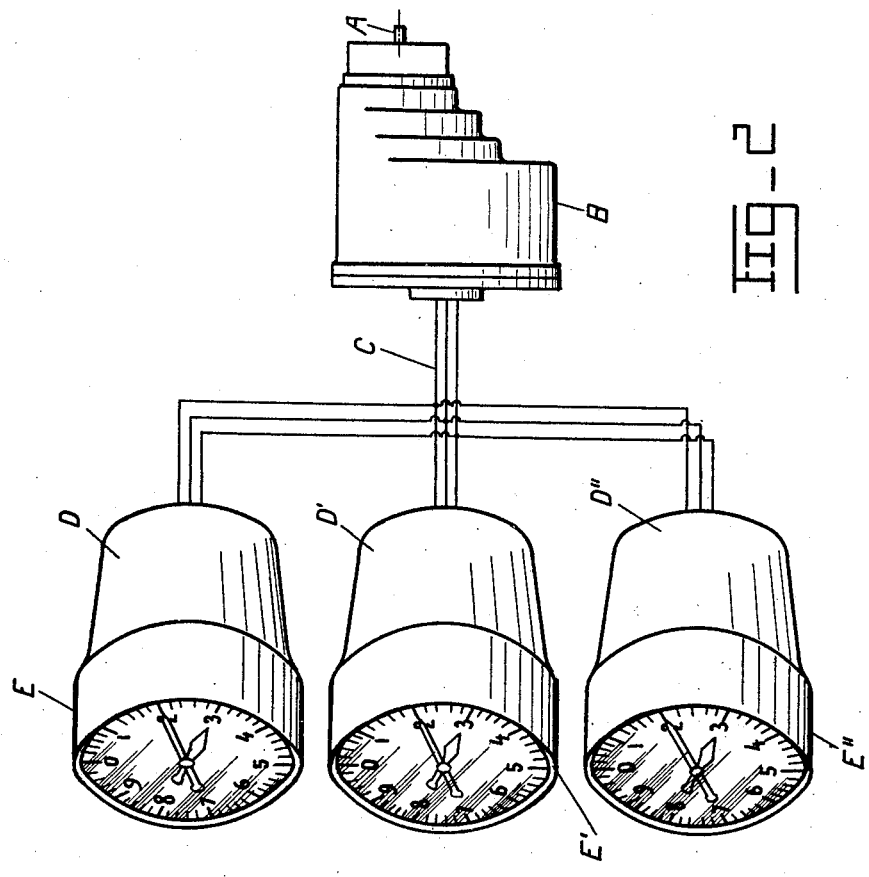
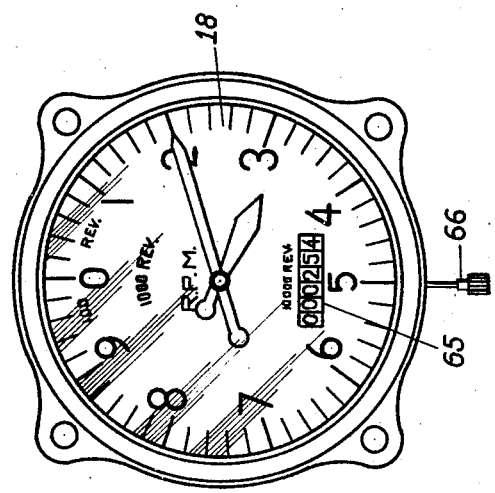
INVENTOR
PAUL KOLLSMAN
BY
ATTORNEY

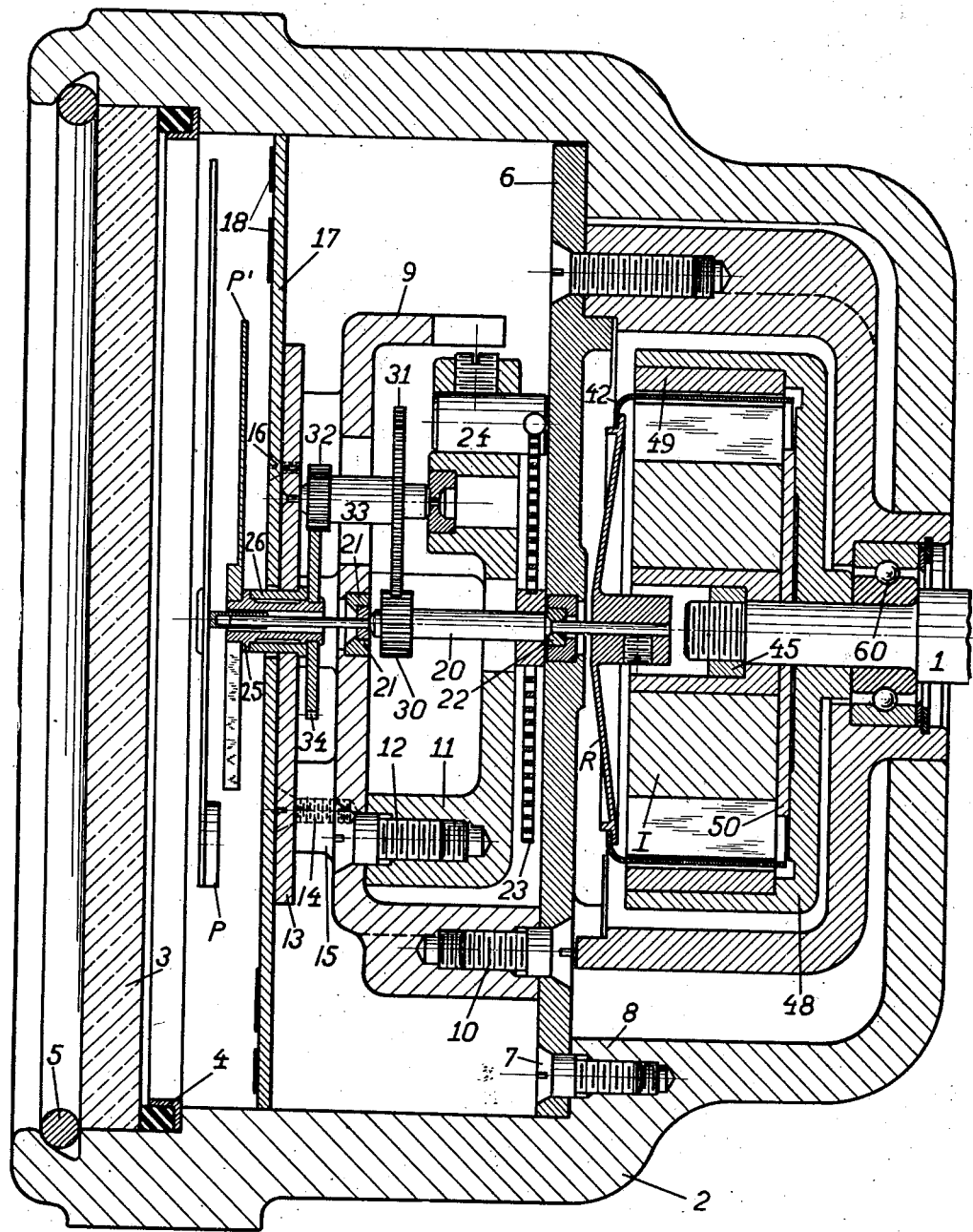
Fig_4

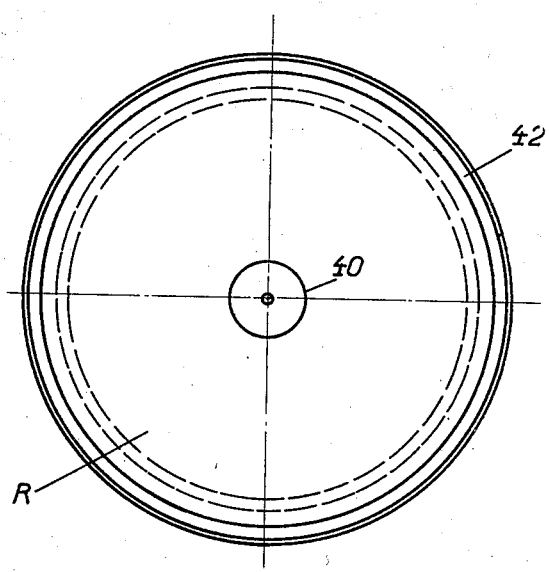
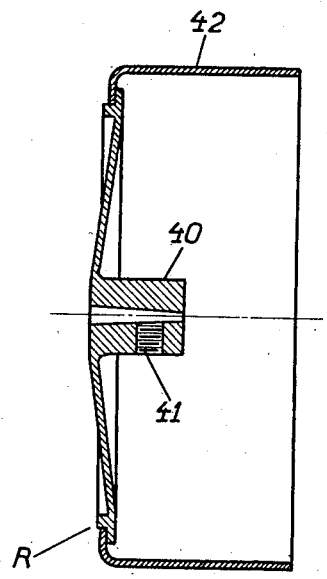
Fig. 5   Fig. 6
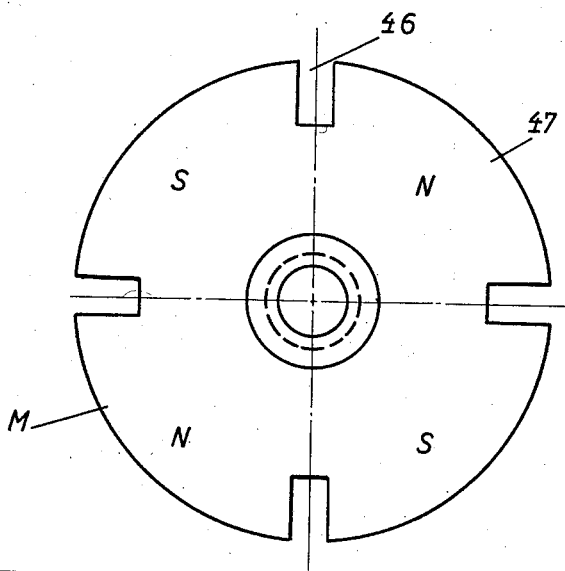
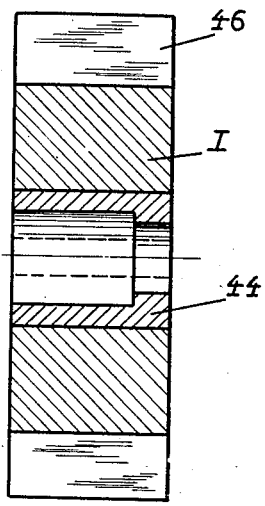
Fig. 7   Fig. 8

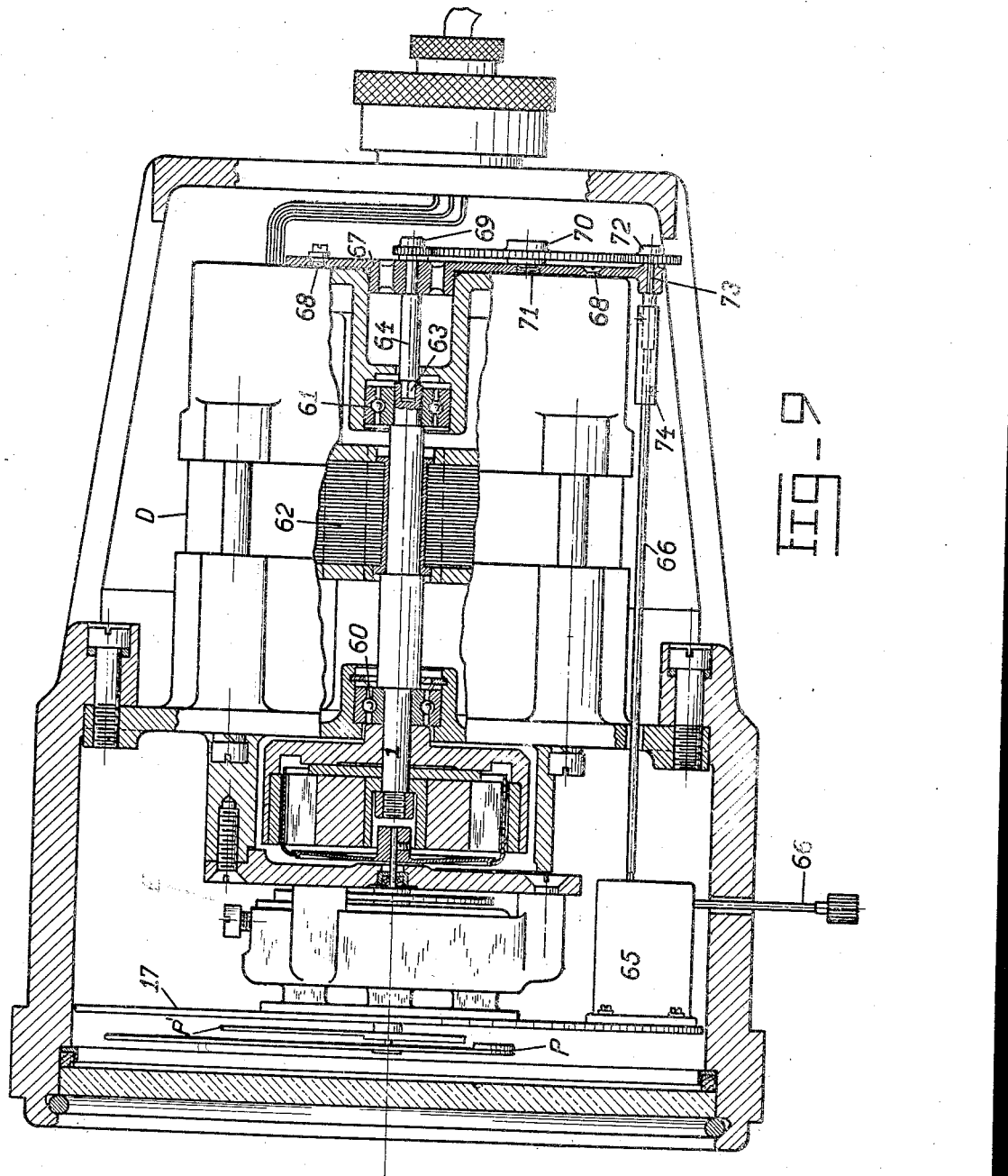

Patented Feb. 25, 1941

2,232,789

UNITED STATES PATENT OFFICE 2,232,789

TACHOMETER

Paul Kollsman, Stamford, Conn., assignor, by mesne assignments, to Square D Company, Detroit, Mich., a corporation of Michigan Application March 22, 1937, Serial No. 132,255

9 Claims. (Cl. 175—183)

This invention relates to the remote indication of the speed of a variable speed prime mover.

The principal objects of the invention are to accomplish this function accurately, dependably and substantially without the need for maintenance and adjustment. In carrying out the invention, the invention generates varying frequency impulses of a frequency in proportion to the speed of the prime mover and transmits the impulses over conductors to a set of one or more remote indicators. In carrying out the invention in the best manner many special elements are preferable in addition to unique combinations of the elements with or without the special features.

The generator of impulses is objectively such that it may be coupled directly to or at least permanently to the prime mover such as to the motor of an aeroplane. In this coupling it is preferable to include a safety friction clutch and usually a rotation multiplier. Furthermore, it is objectively preferable that this generator generate true sine wave impulses. It is a further object that the combined impedance of the set of motors operated remotely from this generator match the impedance of the generator regardless of whether there are operated one, two, three, or more motors. This matching of impedance is facilitated when the energy employed has sine wave form. Also the sine wave form is preferable in effecting dependable self-starting and synchronizing in the remote indicator motors.

A further object of the invention is to combine in the system a dependable self-starting, self-synchronizing set of one or more motors. It is a further object of the invention to combine with each said motor an accurate speed indicator by electro-magnetically coupling it with its motor by means of a permanent magnet rotor entirely free and independent of the field of the motor and operating the indicator by inducing torque currents in a uniquely designed and combined electro-magnetic rotor.

If a revolution counter is to be employed such counter is to be combined with each individual motor independent of the motor torque coupling with the indicator proper.

In general the object of the invention is to provide improved means and an improved method for indicating the speed of rotation of a variable speed prime mover and if desired the total number of revolutions at places convenient to make readings, substantially regardless of where the prime mover is located.

Illustrative embodiments of the invention are described in the following specification in connection with the accompanying drawings. The disclosure in the specification and drawings is intended to explain and not limit the claims.

Fig. 2 is a similar view showing the generator operating a set of three motor driven indicators;

Fig. 3 is a front view as viewed on an instrument panel front of one of the indicators;

Fig. 4 is a longitudinal vertical section drawn to an enlarged scale showing the tachometer and torque coupling mechanism;

Fig. 5 is a front elevation of the coupling rotor with the spindle in cross-section;

Fig. 6 is a longitudinal section through the rotor of Fig. 5;

Fig. 7 is a front elevation of the permanent magnetic multipolar disc of the torque coupling device;

Fig. 8 is a longitudinal section thereof; and

Fig. 9 is a longitudinal section partly in side elevation of the preferred combination between motor and indicating mechanism.

Figure 1:
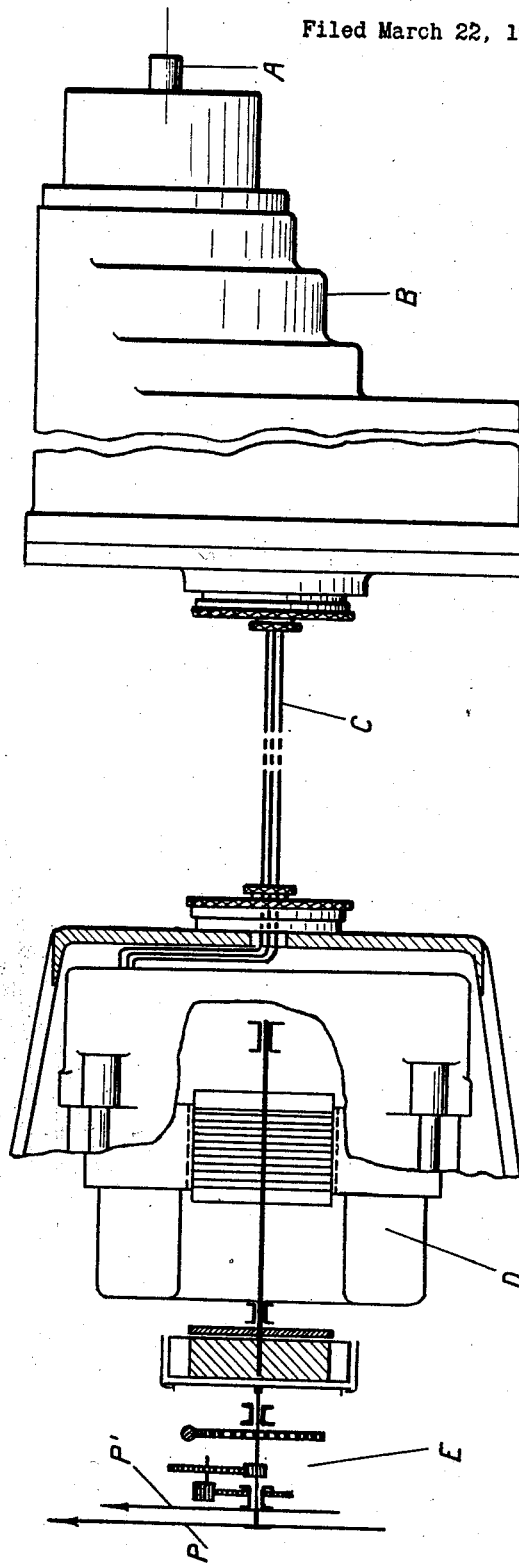
Fig. 1 is a somewhat diagrammatic assembly view from the prime mover to the indicating pointers.

In Figs. 1 and 2, B indicates the generator of electrical impulses from a prime mover A. C indicates the transmission lines for these impulses to a set of one or more self-starting, self-synchronizing, alternating current motors D, each driving its indicator E. In Fig. 1 the set of motors and indicators is one unit D E while in Fig. 2 the set comprises a plurality of units D E, D' E' and D'' E''. It is preferred that the generator B have the construction and functioning described in my co-pending application, Serial No. 132,254, filed March 22, 1937, Speed measuring electric generator; and it is likewise preferred that the self-starting, self-synchronizing motors D have the construction disclosed in detail in my co-pending application, Serial No. 122,775, filed January 28, 1937, Remote speed indicator, now Patent No. 2,211,543.

In the combination of Fig. 1 the impedance of generator B should match the impedance of motor D and all disturbing impedance factors be eliminated from motor D, as for example the coupling between this motor and indicator E.

In the combination of Fig. 2, the impedance of generator B is preferably matched to the combined impedance of the three motors D, D', D'', also without disturbance.

In Fig. 4, the tachometer mechanism and torque drive are combined as a separate unit operated from a rotating shaft 1 driven from any suitable source but preferably as indicated in Fig. 9 later to be described. A suitable casing 2 is provided and is mountable in accordance with standard practice in the instrument panel of an aeroplane. The casing 2 may be closed by the glass disc 3 completing a sight window hermetically clamped over the mouth of the case against the packing gasket 4 by split ring 5.

The least ponderous more delicate parts are assembled to the partition 6 securable as by screws 7 to the ledge 8 of casing 2. A frame 9 secured as by screws 10 to partition 6 in turn supports a sub-frame 11 secured to it as by screws 12. Likewise a bearing plate 13 is secured by screws 14 to bosses 15 outstanding from frame 9. Plate 13 in its turn has secured to it by screws 16 a dial 17 bearing the circular scale 18, the divisions of which are equiangular and preferably include the ten digits of the decimal system.

A central spindle 20 rotates in jewel bearings 21 and 22 and is adjustably negatively biased by the attached hair spring 23, the other end of which is adjustably mounted to the sub-frame 11 by the adjustable boss 24. This hair spring tends to bias the initial counter-balanced sensitive pointer P to zero on scale 18 but permits the operative rotation of the directly mounted pointer P throughout a number of complete rotations. A hub 25 journaled in bearing 26 operatively and rotatively mounts the range pointer P' likewise counter-balanced. Pinion 30 fixed to spindle 20 operates gears 31 and 32 fixed to shaft 33 so that gear 32 drives the range pointer P' through gear 34 preferably at 1/10 rotation so that the two pointers P and P' indicate in two contiguous digits of the decimal system.

Spindle 20 carries the electro-magnetic rotor R. This rotor comprises a flanged hub 40 securable coaxially to spindle 20 by both a driving fit and a set screw 41. It is preferable that this part be constructed of aluminum or other suitable light weight material. Secured to its rim is a cylindrical shell 42 preferably of manganese copper which is illustrative of any conducting metal the co-efficient of conductivity of which varies little with temperature change over a wide range. Such material is deliberately selected and employed although its co-efficient of electric conductivity be low. It is considered better to increase the magnetic force of the inductor enough to compensate for any low electric conductivity of this shell 42. In this way the percentage of error due to a temperature change in conductivity is very little and even negligible.

Cooperating with the rotor R is an inductor I driven by the shaft 1 coaxial with spindle 20. The inductor comprises a disc shaped permanent magnet M fitted with a machined soft steel core 44 which facilitates centering and securing to the shaft 1 as by nut 45. This permanent magnet has a plurality, preferably four, symmetrically positioned notches 46 dividing it into four poles 47 preferably of alternating polarity. A cup shaped holder 48 mounts this permanent magnet on spindle 1 and is preferably made of aluminum. This holder likewise mounts a peripheral spaced ring 49 of machined magnetic material such as soft iron between which and the poles 47 is rotatably positioned the cylinder 42 close to and coaxial with but out of contact therewith. Beneath the permanent magnet M is preferably located a shunt disc 50 of nickel steel or any suitable magnetic material; the magnetic conductivity of which increases inversely with temperature change. This disc preferably underlies and laps the poles 47 about 1/4 of the depth of the notches 46. In functioning the thickness and diameter of this shunting disc as well as its material may be chosen and proportioned so as to shunt away from the rotor shell 42 just enough magnetism to compensate for any change in conductivity of shell 42 due to a temperature change. An increase in conductivity is offset by a compensating decrease of current inducing magnetism. In this way perfect temperature compensation may be effected.

It is also desirable that the hair spring 23 be fabricated so that its negative torque operating against the positive torque of rotor R causes the speed of rotation of shaft 1 to be indicated accurately by the pointers P and P' on scale 18, that is, so that equal increments of speed for shaft 1 are indicated by equal increments of rotation of pointers P and P' and this regardless of the range throughout which these speed increments occur.

Fig. 1 diagrammatically indicates the preferred coordination of all the parts from the prime mover A to the indicators P.

In Fig. 9 the preferred combination of a motor D with an indicator E is shown. In this embodiment the shaft 1 is an extension of the rotor shaft of motor D and is shown journaled approximately at its respective ends by ball bearings 60 and 61. A detailed description of motor D may be found in my co-pending application, Serial No. 122,775, filed January 28, 1937, Remote speed indicator. Sufficient for this case let it be understood that 1 is the motor shaft driven by rotor 62 which is self-starting and self-synchronizing in response to the impulses received from generator B.

If desired a coupling socket 63 may be formed in the free end of shaft 1 to couple with a sub-shaft 64 for driving a revolution counter 65 viewable through the dial 17. It is to be understood that any suitable well-known revolution counter calibrated to indicate anything desired, such as air speed or revolutions, may be employed. Likewise it is to be understood that such a revolution counter may be fitted with the usual setting mechanism 66. Shaft 64 drives this revolution counter through a suitable gear train operating extension shaft 66. A spider 67 journals shaft 64 and may be fixed to the motor frame as by screws 68. Gear 69 drives idler 70 journaled on stub shaft 71. This idler in turn drives the pinion 72, the shaft 73 of which is adjustably coupled by coupling 74 to extension shaft 66, which in turn drives the revolution counter 65.

What I claim and desire to secure by United States Letters Patent is:

1. In combination a generator of substantially sine wave electrical impulses of frequencies proportionate to varying speed of rotation of a prime mover; a set of one or more remote self-starting, self-synchronizing alternating current motors electrically connect with said generator and electrically proportioned so that the combined impedance of said set substantially equals that of said generator; a negative spring torque biased speed indicating pointer for each said motor; and a positive torque electro-magnetic device driven by said motor but independent from the field thereof for positively operating said pointer.

2. In a speed indicating system, a single self-excited poly-phase generator having an impedance, and a plurality of motors coupled thereto, each motor having a speed indicating member driven thereby, the respective motors having impedances of a magnitude different from the impedance of said generator but such that the combined impedance of the several motors is approximately equal to the impedance of the said generator.

3. In a speed indicator, a multi-polar permanent magnetic element, a tubular metallic member adjacent thereto, an annular soft iron armature surrounding said metallic member and rotating with said magnetic element, and a disk of magnetic material adjacent to and rotatable with said elements, said disk having a negative magnetic permeability co-efficient and partially shunting said element.

4. A remote speed indicating system comprising, in combination, an A. C. generator adapted to be driven at a speed to be measured; an A. C. repeater motor connected to be driven by said generator; means connected to be operated by said motor for creating a torque proportional to the speed of the motor; and indicating means responsive to said torque, whereby upon a decrease in speed a decreasing load is applied to said repeater and generator enabling the repeater to follow the generator even at a low generator output incidental to low speed.

5. A remote speed indicating system comprising, in combination, a multiphase A. C. generator adapted to be driven at a speed to be measured; a multiphase self-synchronizing repeater motor connected to be driven by said generator; means connected to be operated by said motor for creating a torque proportional to the speed of the motor; and indicating means responsive to said torque, whereby upon a decrease in speed a decreasing load is applied to said repeater and generator enabling the repeater to follow the generator even at a low generator output incidental to low speed.

6. In a speed responsive device the combination with a permanent magnet mounted for rotation about an axis, and a coaxially mounted metallic member tending to follow said magnet by virtue of eddy currents set up in the same; of a disk of magnetic material arranged adjacent to, and rotatable with, said magnet partially to shunt the same, said disk having a magnetic permeability coefficient decreasing upon an increase in temperature.

7. In a speed responsive device the combination with a multipolar permanent magnetic element mounted for rotation about an axis, and a coaxially mounted metallic member tending to follow said element by virtue of eddy currents set up in the same; of a disk of magnetic material mounted on said element at least partially to cover the poles thereof, said disk having a magnetic permeability coefficient decreasing upon an increase in temperature.

8. A remote speed indicator comprising, in combination, an instrument supporting casing having a window; a dial visible therethrough; a pointer mounted for rotation relatively to said dial; a shaft connected to move said pointer; a metallic member mounted on said shaft; a permanent magnet mounted for rotation adjacent to, and coaxial with, said metallic member, thereby inducing eddy currents in said member causing said member to be dragged along by said magnet; a disk of magnetic material mounted adjacent said magnet partially to shunt said magnet, said disk having a magnetic permeability coefficient decreasing upon an increase in temperature; a spring arranged to oppose the movement of said member; and a multiphase motor supported by said casing, said motor having a shaft carrying said permanent magnet.

9. A remote speed indicator comprising, in combination, an instrument supporting casing having a window; a dial visible therethrough said dial bearing a decadic graduation; a first and a second pointer mounted for concentric rotation relatively to said dial; a gear train connecting said pointers to move said second pointer at one-tenth the rate of said first pointer; a shaft carrying said first pointer; a metallic member mounted on said shaft; a permanent magnet mounted for rotation adjacent to, and coaxial with, said metallic member, thereby inducing eddy currents in said member causing said member to be dragged along by said magnet; a disk of magnetic material mounted adjacent said magnet partially to shunt said magnet, said disk having a magnetic permeability coefficient decreasing upon an increase in temperature; a spring connected to bias said pointers towards zero indication; and a multiphase motor supported by said casing, said motor having a shaft carrying said permanent magnet.

PAUL KOLLSMAN.